July 10, 1928.

M. F. CARR

LUBRICATING APPARATUS

Filed Oct. 9, 1926

Inventor:
Moses F. Carr.
by Emery, Booth, Janney & Varney, Attys.

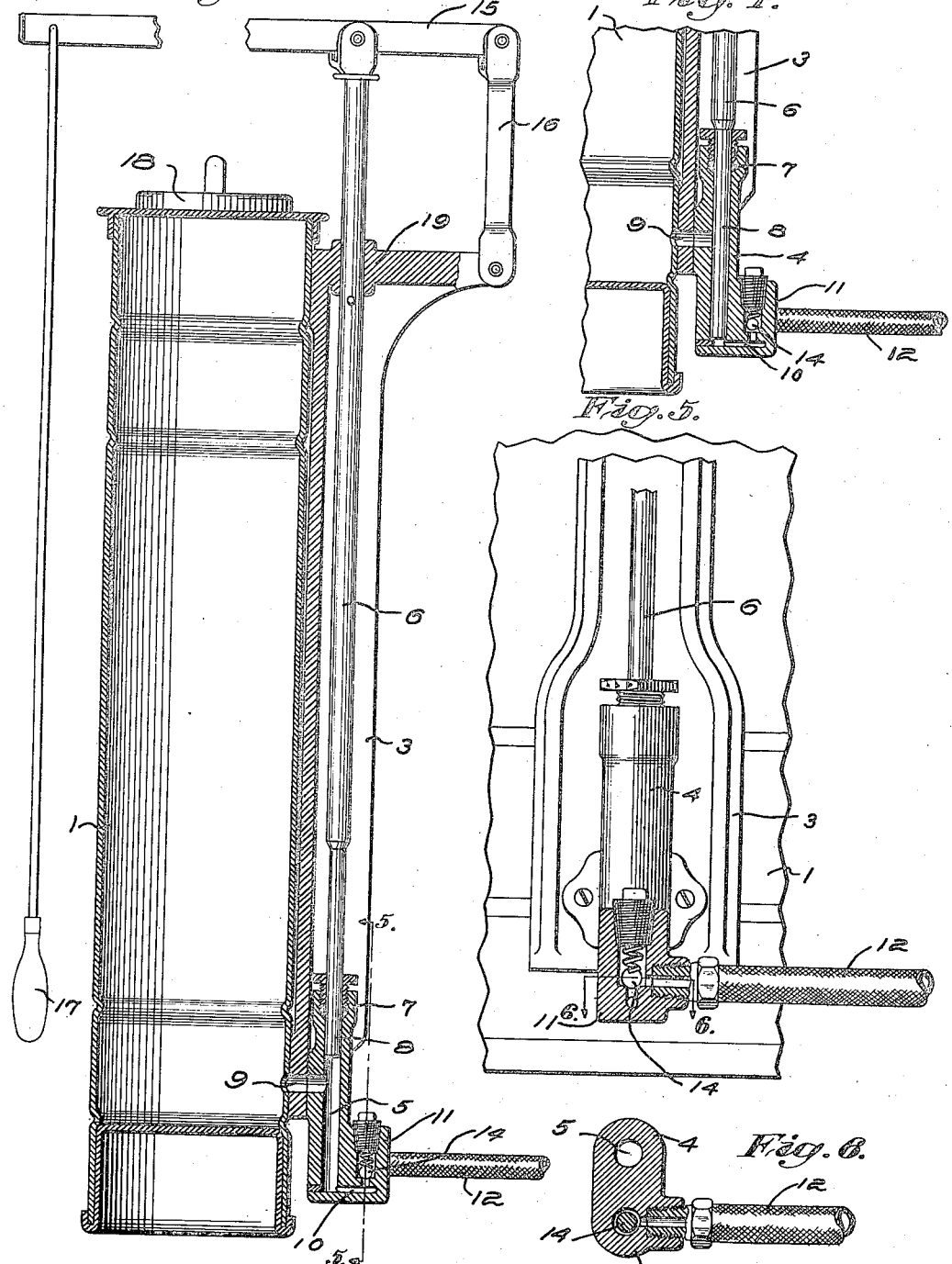

Patented July 10, 1928.

1,676,424

UNITED STATES PATENT OFFICE.

MOSES F. CARR, OF LEXINGTON, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed October 9, 1926. Serial No. 140,526.

This invention aims to provide improvements in lubricating apparatus and more particularly in portable apparatus to be carried about on the person of the operator, when in use.

In the drawings, which illustrate a preferred embodiment of my invention:—

Fig. 3 is an enlarged section on the line 3—3 of Fig. 2, being partly in elevation;

Fig. 4 is a section on the line 4—4 of Fig. 2, the high pressure piston being at the end of its stroke during expulsion of lubricant from the high pressure chamber;

Fig. 5 is an enlarged section on the line 5—5 of Fig. 3; and

Fig. 6 is a section on the line 6—6 of Fig. 5.

Figure 1:
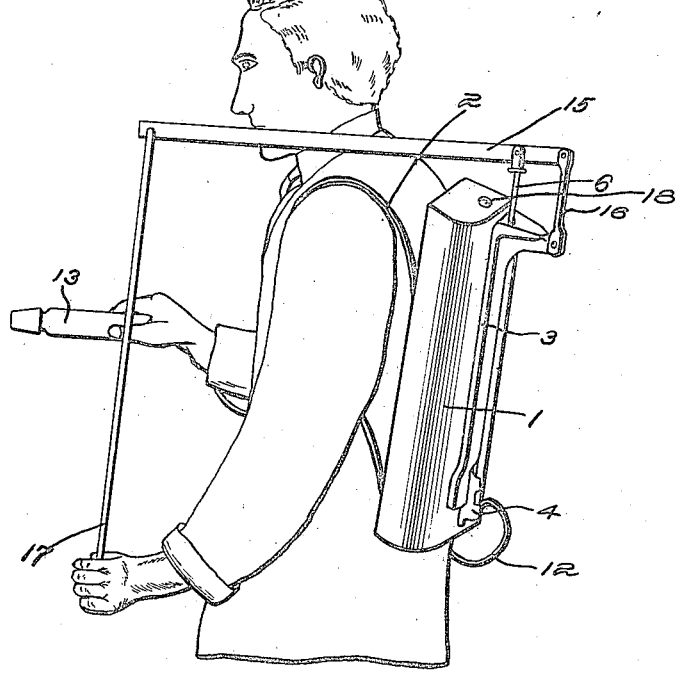
Figure 1 is a side elevation of the apparatus shown in position of operation as carried by the operator.

Referring to the embodiment of my invention shown in the drawings, I have illustrated a knapsack device for use in garages, machine shops and like places, where a large number of bearings must be lubricated.

The device which I have selected for illustrative purposes includes a tank 1, having straps 2 secured thereto for fitting over the shoulders of the operator as shown in Fig. 1. A bracket 3 is secured to one face of the tank and a part 4, having a bore providing a cylinder or chamber 5, is secured to the bracket 3, adjacent to the bottom of the tank as best shown in Figs. 2, 3 and 5.

A rod 6 is slidably mounted in the bracket 3, and the lower end thereof is reduced to enter the chamber 5, through a packing 7, to provide a piston 8.

Lubricant may enter the chamber 5 through the port 9 between the chamber and the tank 1, and it may be forced out of the chamber, through the passage 10 provided in the boss 11, at the side of the part 4. A hose 12 is connected to the boss 11 and communicates with the passage 10, as shown in Fig. 5. At the other end of the hose 12 is provided a suitable lubricant gun or coupling device 13, for making a quick detachable connection with a nipple on a part to be lubricated (not shown). Between the hose 12 and the chamber 5, in the passage 10, I have provided a spring-pressed ball check 14, which permits passage of lubricant to the hose, but prevents return to the chamber. Thus upon the return stroke of the piston, lubricant cannot be drawn by suction from the hose 12 into the chamber 5. The chamber can only be filled by lubricant from the tank 1, after the piston 8 passes the port 9.

Figure 2:
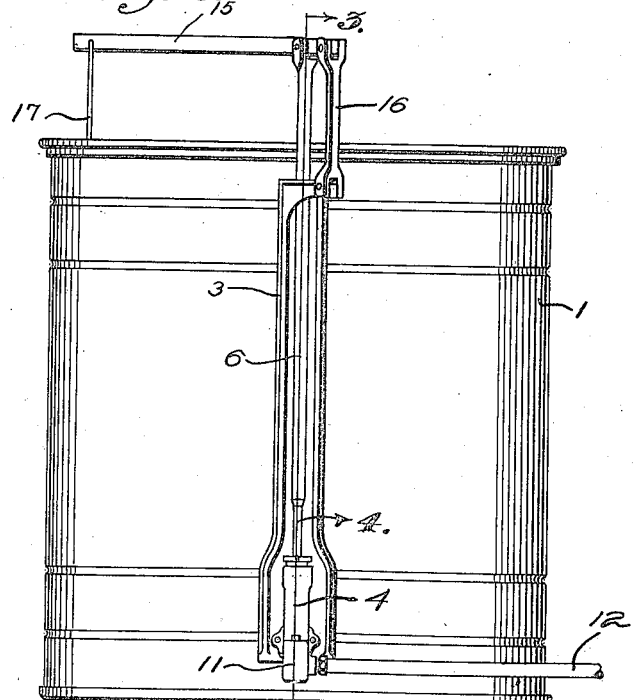
Fig. 2 is an elevation view of the apparatus, the coupling member and a portion of the hose being omitted.

The rod 6 may be reciprocated by a lever 15, pivoted at one end on a link 16, the link also being pivoted upon the bracket 3, as shown in Figs. 1 and 2. The rod 6 is connected to the lever between its ends.

The rod 6 is preferably positioned centrally of the tank 1 and the lever 15 crosses the top of the tank at an angle, as shown in Fig. 2, so that it will pass over one shoulder of the operator, to permit the handle 17 to hang in a convenient position for operation of the lever, as shown in Fig. 1.

Lubricant may be placed in the tank 1 through the screw cap 18 on the top of the tank.

Assuming that the tank has a supply of lubricant in it and that the apparatus is strapped to the back of the operator, as viewed in Fig. 1, lubricant may be supplied under pressure to a nipple as follows. First, the operator walks up to the machine and, with one hand, couples the gun or coupling device 13 with a nipple, then with the lever and piston in the position shown in Fig. 2, he may, with his other hand, pull downwardly on the handle 17. As lubricant has previously flowed from the tank 1 through the port 9 to the chamber 5, this chamber is now full of lubricant and after the port 9 has been cut off by the piston, the lubricant will be forced, under relatively high pressure, from the chamber 5 past the ball check 14 and through the hose to the nipple.

The volume of lubricant expelled by one downward movement of the piston is usually sufficient to lubricate a bearing. Therefore the operator may disconnect the coupling device from the nipple and push upwardly on the handle to raise the piston and allow the chamber to become refilled with lubricant. The operation may then be repeated.

A pin 19 projects from the rod to act as a stop which contacts with the bracket 3 to limit the upward movement of the rod, as shown in Fig. 3.

The piston and chamber are located centrally between the straps so that the strain of the downward pull on the lever will be distributed equally on both shoulders of the operator, whereas the strain would be uneven if the piston and chamber were located at one side of the tank.

This particular type of device is very simple in construction and operation and may be very conveniently strapped to the operator so that he may move quickly from one nipple to another, and from one machine to another, without any time being lost.

While I have shown and described a preferred embodiment of my invention, it should be understood that I do not wish to be limited thereto, my invention being best defined in the following claim.

Claim:

A lubricant compressor adapted to be carried upon the back of the operator comprising a relatively wide and long reservoir, carrying straps attached to one side of said reservoir, a bracket secured to the other side of the reservoir and extending substantially the length thereof, a cylinder casting mounted at the lower end of said bracket, a plunger reciprocable in the cylinder of said casting, a plunger operating rod formed integrally with said plunger and guided at its upper end in said bracket, a link pivoted to said bracket, a lever pivoted to said link and to the end of said plunger operating rod and extending transversely across said reservoir, and a handle pivotally connected to said lever and depending therefrom in the position in which it is adapted to be grasped by the operator when the reservoir is carried upon the operator's back.

In testimony whereof, I have signed my name, to this specification.

MOSES F. CARR.